E. W. REID.
CAMPING WAGON.
APPLICATION FILED MAR. 9, 1916.

1,280,841.

Patented Oct. 8, 1918.
2 SHEETS—SHEET 1.

Witness
Inventor
EDWARD W. REID.
By
Attorney

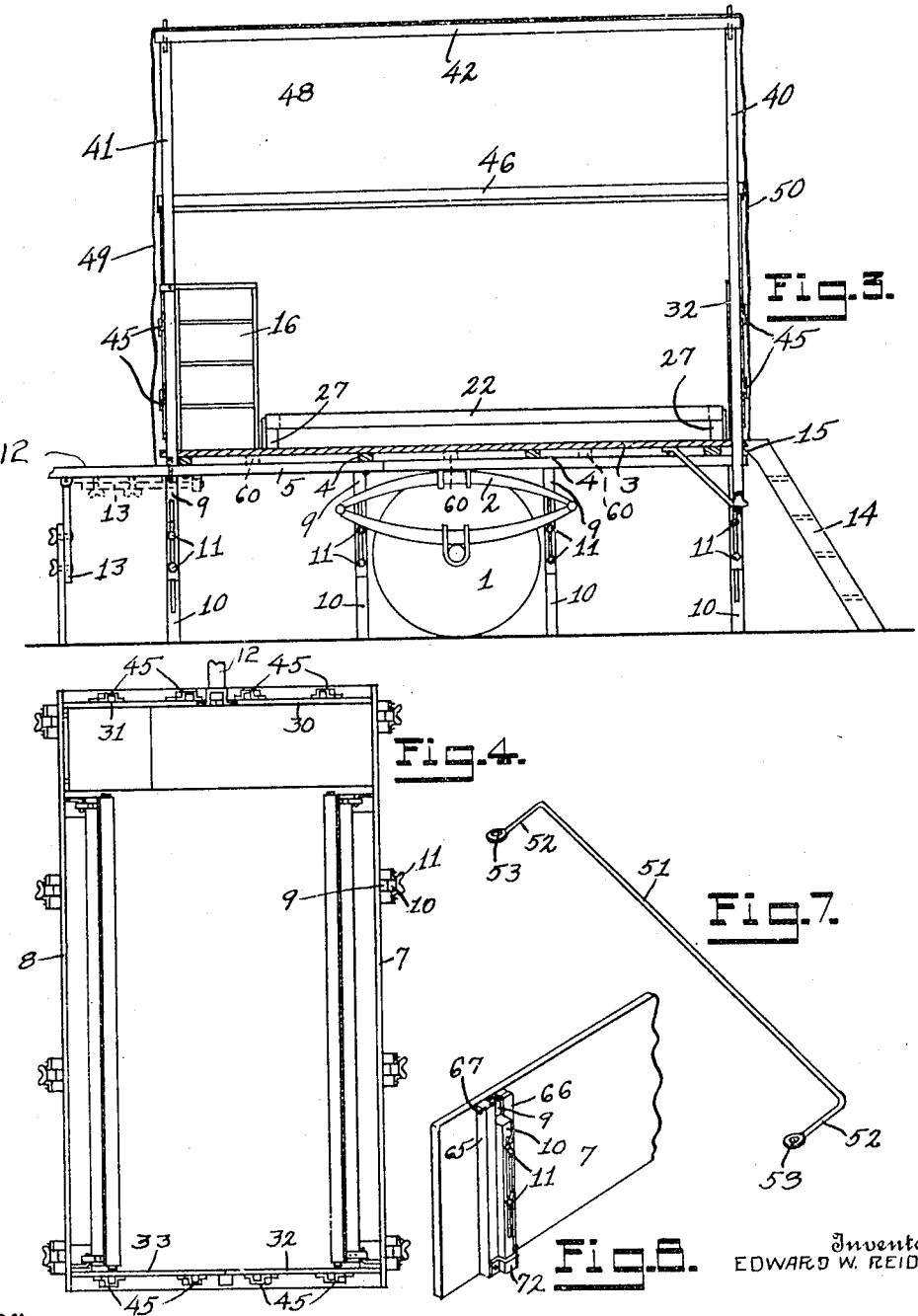

UNITED STATES PATENT OFFICE.

EDWARD W. REID, OF DETROIT, MICHIGAN.

CAMPING-WAGON.

1,280,841.　　　Specification of Letters Patent.　　Patented Oct. 8, 1918.

Application filed March 9, 1916. Serial No. 82,999.

*To all whom it may concern:*

Be it known that I, EDWARD W. REID, a citizen of the United States, residing at Detroit, county of Wayne, State of Michigan, have invented a certain new and useful Improvement in Camping-Wagons, and declare the following to be a full, clear, and exact description of the same, such as will enable others skilled in the art to which it pertains to make and use the same, reference being had to the accompanying drawings, which form a part of this specification.

This invention relates to camping wagons and its object is a wagon adapted for use as a trailer in conjunction with an automobile or other vehicle and adapted to transport the tent covering and supporting framework, etc., when not in use as a camp and of such form and construction as to be readily set up to provide a living or sleeping compartment and having a clear floor space when used as a living compartment. A further object of the invention is a vehicle body having the side members thereof so arranged as to be placed in the plane of the floor of the body to provide a tent floor, and provided with means for detachably carrying and supporting a tent structure thereon. A further object of the invention is a vehicle body having hinged side members adapted to be secured in either vertical or horizontal position to form a wagon box or a floor for the tent erectable thereon and having bed frames in foldable relation with the said side members. A further object of the invention is a vehicle body having the hinged side members adapted to be secured in either horizontal or vertical position as stated and each carrying a bed frame in pivotal relation therewith and foldable in such manner that when the beds are not in use the same may be turned to vertical position at the outer edge of the said side members providing a clear floor space between the said frames, and a knockdown tent construction adapted when erected to be carried and supported solely by the wagon. These and other objects and the several novel features of construction are hereinafter more fully described and claimed and shown in the accompanying drawings in which—

Fig. 3 is a longitudinal section of the device taken on line x—x of Fig. 1.

Fig. 4 is a plan view of the wagon body when folded for transportation of the parts.

Fig. 7 is a detail in perspective of a supporting member for the fly used with the tent.

Fig. 8 is a detail in perspective of a supporting standard for the side members of the vehicle body in position assumed when said side member is folded to vertical position.

Similar characters refer to similar parts throughout the drawing and specification.

Figure 1:
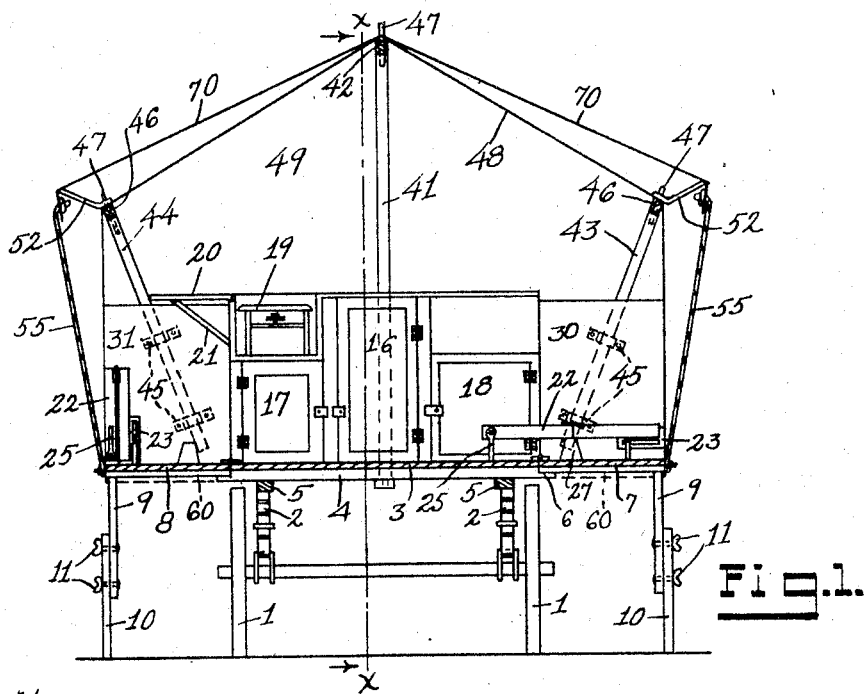
Figure 1 is a cross-section of a trailer and knock-down tent construction embodying my invention showing the position of the parts when erected for use as a tent.
Figures 2, 5:
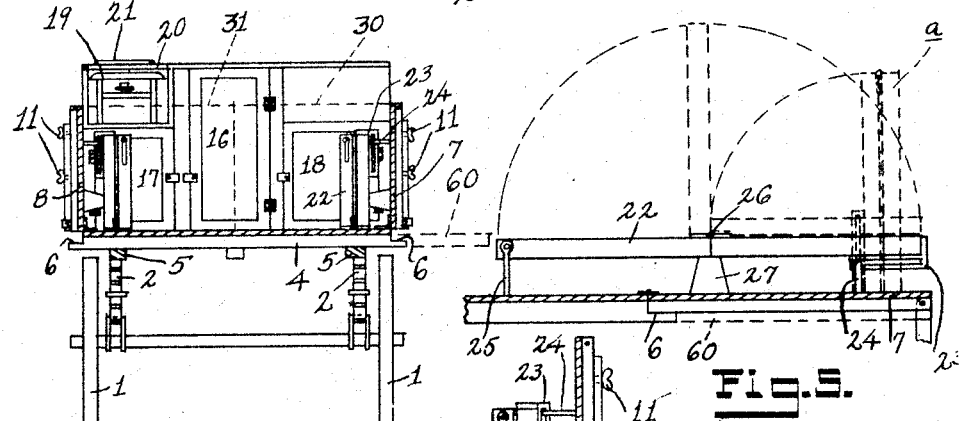
Fig. 2 is a similar section showing the parts in the position assumed when folded for use in transportation of the several detachable parts.
Fig. 5 is a detail showing the bed in full lines when extended for use as a bed and showing in dotted lines the bed folded to provide a clear floor space.

The apparatus is to be used as a trailer for a vehicle and preferably is provided with a single pair of wheels, 1, 1, on the axle of which is carried the springs 2, 2. The body of the vehicle is substantially centrally supported on these springs as may be understood from Fig. 3. It is to be understood, however, that a four wheeled structure may be utilized, if desired, without departing from the spirit of this invention. The body of the vehicle consists of the bottom or floor portion 3 carried on the cross stringers 4, 4, etc., which in turn are supported on the longitudinal members 5, 5, etc. The two outside stringers 5, are directly mounted on the springs as may be understood from Figs. 1 and 2. The cross members 4 are somewhat greater in length than the width of the bottom 3 and are notched at the ends at 6. The side members 7 and 8 of the vehicle body or box are hinged respectively to the longitudinal sides of the bottom portion 3 and may be secured either in a horizontal plane with said bottom portion 3 as indicated in Fig. 1, or at right angles thereto as indicated in Fig. 2, to form a box for the transportation of the parts of the apparatus as hereinafter described. These side portions 7 and 8 are so supported on the bottom portion 3 as to form an extension of the said portion on each side as may be understood from Fig. 1, in which position a floor of considerable width is provided. The projecting ends of the cross members 4 provide a support for the hinged edge of the side members when extended.

Each of these side members is provided with several standards 9 hinged thereto, which standards each have an extensible portion 10 secured thereto by the bolts and nuts 11. Both the standards 9 and 10 are preferably provided with a slot through which these bolts extend thus providing a support adjustable in length. In setting up the apparatus it is necessary to support the side members in a plane with the bottom to provide a level floor for the device, and the adjustable standards provide a means whereby these side portions 8 may be supported in proper relation with the bottom portion 3 on a surface that is somewhat uneven.

By use of a single truck on which the wagon body is practically centrally mounted as here shown, the floor may be set on a level longitudinally by raising or lowering either end as may be found necessary. For this purpose the tongue 12 of the trailer may be provided with an extensible support 13 of any approved type preferably pivoted thereto as indicated, and the rear end of the vehicle may be supported by the steps 14 indicated in Fig. 3, by means of which the vehicle may be entered. This step portion is to be understood as being provided with means indicated at 15 engaging the end of the floor 3 or cross members of the vehicle body, and by setting the steps at various angles the end of the vehicle may be raised or lowered as is found necessary to bring it to a level. Other means for supporting the end of the vehicle, however, may be utilized without departing from the spirit of this invention.

Extending across the front of the bottom portion 3 of the vehicle body is a series of cupboards 16, 17 and 18 of any approved form having doors as indicated in Fig. 1. One of the cupboards as for instance 18, may be utilized as an ice-chest. A stove 19 may be carried in a compartment provided therefor as indicated in Fig. 1, and a shelf 20 is hinged to the compartment providing a cover therefor when the stove is not in use, as indicated in Fig. 2, or it may be utilized as a shelf as indicated in Fig. 1, for which purpose a bracket 21 is provided to support the shelf.

Each of the side portions 7 and 8 carry a bed frame 22 preferably foldable as shown. At each end of the bed frame and on one side thereof is a slotted bracket 23, and a rod or pin 24 is secured to the side member having an end extending through the slot of the bracket 23. These rods 24 and brackets 23 support one side of the bed when extended for use as indicated in Fig. 5. The opposite longitudinal side of the bed is supported by the pivoted legs 25, one at each end of the bed frame. As the two end members of the bed frame are hinged together as indicated at 26, it is necessary to provide a support for the frame beneath said hinge points. For this purpose blocks 27 are provided at each end of the bed frame as indicated in Fig. 3, which blocks are secured to the side member 7. When extended as shown in full lines in Fig. 5, therefore, the frame is solidly supported.

Figure 6:
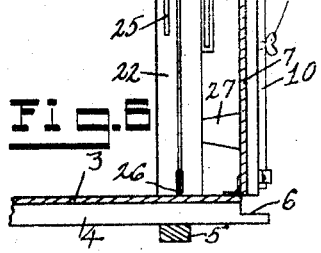
Fig. 6 is a similar detail showing the position occupied by the bed when folded for transportation.

When not required for use, the bed frame may be folded one-half thereof upon the other half, as indicated by dotted lines in Fig. 6, and the halves set in vertical position indicated by the dotted lines $a$ near the extreme outer edge of the member 7. With the bed frames upon each side thus folded and turned to vertical position relative to the side members 7 and 8 when in horizontal position as shown in Fig. 1, free floor space of considerable area is provided. If both bed frames are opened for use in the manner indicated at the right of Fig. 1, a clear space between the beds is provided, forming an aisleway to enter the vehicle as may be readily understood. The utility of the sliding bracket 23 is apparent more particularly in Fig. 5, in which it is seen that when the bed is extended for use the rod or support 24 lies at one end of the slot. When the bed is folded and turned to vertical position the bed turns on the pins 24 as a pivot and by reason of the position of the bed frame occupies the opposite end of the slot 20 in the bracket 23. With the bed folded and turned to vertical position as indicated in Fig. 5, the side member 7 may be turned to vertical position indicated in Fig. 6. The bed frames then will be supported on the floor portion 3 of the vehicle body and the space between the frames and the member 7 or 8 respectively may be utilized to store the bedding. Some of the bedding may also be carried between the folded frames.

Each side member 7 and 8 has secured to each end thereof a part 30 and 31 respectively extending at a right angle thereto, which when the parts 7 and 8 are folded to upright position as shown in Fig. 2, form an end of the vehicle box. The parts 30 and 31 are at the forward end of the vehicle and, when the side members are in vertical position, extend behind the cupboards. At the opposite ends the side members have similar portions 32 and 33. These side and end members when in vertical position form a closed box. When the side members 7 and 8 are folded downward to horizontal position as indicated in Fig. 1, the parts 30, 31, 32, and 33, stand vertically. These parts 30, 31, 32 and 33 may be secured to the side members 7 and 8 in any approved manner preferably with brackets of proper form to give strength to the parts.

The floor 3 is provided with an aperture centrally at each end to receive central poles 40 and 41 of the tent frame. Extending between the two poles 40 and 41 is a longitudinal member or bar 42 forming the ridge pole for the tent. As may be more clearly understood from Fig. 1, side poles 43 and 44 are provided at each end of the device extending at an angle to the vertical as indicated, each being supported in similar brackets 45 carried on each half of the end members 30, 31, 32 and 33. Longitudinal members or bars 46 extend between the two angular members 43 on one side of the vehicle and likewise between the two angular members 44 on the opposite side. The various upright members or poles 40, 41, 43, and 44, carry the usual pins 47 at the end thereof, and a canvas tent like cover 48 is provided with the usual eyelet to pass over these pins as in the ordinary tent construction. The tent is provided with usual end walls 49 and 50, the end 50 being divided in the usual manner to provide an entrance to the structure.

The tent covering 48, on each side of the vehicle, extends over the longitudinal members 46 and extends downward therefrom and is secured in any approved manner to the edge of the side members 7 and 8 respectively to hold the canvas structure taut. By thus securing the canvas, the usual guy ropes and tent pegs may be dispensed with. A canvas fly 70 is secured over the tent structure 48 by the pins 47 on the poles 40 and 41 which project through eyelets provided in the fly. A light frame 51 is secured to the side edges of the fly, a detail of which is shown in Fig. 7. This frame is preferably made of metal and is formed of a body with the two end portions 52 extending at an angle thereto. At the extreme end these two portions are each bent to form an aperture 53, to receive the pins at the ends of the two poles 43 on one side of the structure, or the two poles 44 on the opposite side. The portion provided with the aperture is bent at an angle to its respective end portion 52 so that when the frame is in position it extends outward and upward from the hip of the tent. Near the edge the fly is secured to the longitudinal portion of this frame 51 and at the extreme edge is provided with the usual eyelets through which the guy ropes 55 are secured. The opposite ends of these guy ropes may be secured in any approved manner to the edge of the side member 7 or 8, provision being made to draw the ropes taut to properly stretch the fly. The eyes or apertures 53 in the frame are made somewhat larger than the pins over which they are adapted to pass in order to allow these frames to rock slightly on the pins. As the fly stretches in use the frames may thus tilt downward to some extent to allow the fly to be drawn tautly as desired.

The means for fastening the edge of the tent canvas 48 to the edge of the side members 7 or 8 is not here shown in detail but the fastening may be of any approved type as, for instance a button usually used in carriage covers, for which purpose the edge of the canvas should be provided with eyelets to pass over the buttons.

As may be seen in Fig. 3 the cupboards occupy the front end of the bottom 3 of the vehicle body and the bed frames are of such length that when extended, as shown at the right of Fig. 1 and in Fig. 3, they fold down in front of the cupboards. For this reason the wagon bottom 3 should be in the neighborhood of 8 feet in length so that cupboard space may be provided and still leave room for a bed frame of substantially six feet in length.

When the side frames 7 and 8 are folded to upright position as is indicated in Fig. 2, the end members 30, 31, 32, 33 extend across the ends of the bottom between the side members. An open box is thus provided in which the several members of the tent structure may be stored for transportation and over which the fly may be spread to protect the same from the elements during transportation. With the bed frames in hinged relation with the side members as shown, and brought to vertical position when the side members 7 and 8 are turned to upright position, a clear floor space between the vertically positioned bed frames is provided for storage purposes and the carrying not only of the tent paraphernalia but other goods as may be necessary.

As heretofore stated the cross members 4 extend each side of the wagon bottom 3 providing a support for the hinged edge of the said members. To additionally support these side members a loose cross bar 60 indicated by dotted lines in Figs. 1 and 2 may be inserted between the stringers 5 and the bottom 3, and extending out under both the side members. A substantially solid floor may thus be provided without necessity of using the extensible supports 9 and 10.

The extensible standards 9 and 10, as may be understood from Fig. 8, are pivotally supported at the top end of the strips 65 and 66 secured to the side member 7 or 8 as the case may be. The member 9 is pivoted at 67 to these two side strips which are spaced apart to receive the said parts 9 and 10. To hold these extensible supports, against the side member when folded, a U shaped bracket 72 is provided at the lower end of the two strips and the end of a portion 10 may be inserted therein as indicated in Fig.

8 whereupon the nuts of the bolts securing the two parts 9 and 10 together may be tightened to prevent vertical displacement of the part 10. In this manner when the parts are arranged for transportation, the standards are properly secured in folded relation with the side members.

From the foregoing description it is evident that the device is comparatively simple and of comparatively inexpensive construction and that the parts are adapted either for use in transportation of the tent structure and other material or to detachably support the tent structure when erected thereon, and that the positioning of the parts for the various uses for which they are designed may be readily and quickly accomplished, and that when erected a tent of ample proportions is provided having a suitable floor and the various necessary appurtenances such as beds, cupboards, etc., required for campers' use.

Having thus described my invention, and its utility, what I claim and desire to secure by Letters Patent of the United States is—

1. In a camping wagon, a wagon bed or bottom, a side member pivotally secured to each longitudinal side thereof and adapted to be secured in upright position or in a horizontal plane therewith to provide a floor, a foldable bed frame on each side member adapted to fold to upright position to provide a side wall at the outer edge of the side members when turned to horizontal position, or turned to horizontal position for use, and a knock-down tent construction detachably supported by the said bottom and side members when in extended relation.

2. In a camping wagon, a wagon bed or bottom, longitudinal side members pivotally secured to each side thereof adapted to be secured in vertical position or in a horizontal plane with said bottom to form a floor, a bed frame pivotally carried by each side member adapted to be folded to upright position at the outer longitudinal edge of said member to provide a side wall when said side members are in the horizontal plane with the bottom, or folded to extended relation for use, said bed frames being further adapted to be turned to vertical position, parallel with said side members, and a knock-down tent construction supported by the said bottom and side members when in extended relation.

3. In a camping wagon, a wagon bed or bottom, longitudinal side members adapted to be secured in vertical position or in a horizontal plane with said bottom to form a floor, each side member having two end members secured at a right angle thereto, each two adjacent members forming a closure for the end of the box when the side members are in vertical position, a bed frame pivotally mounted on each side member adapted to be folded to vertical position at the outer longitudinal side thereof when the side member is in horizontal position and folded to vertical position relative to the wagon bottom parallel with the side members when said members are folded to vertical position.

4. In a camping wagon, a wagon bed or bottom, longitudinal side members hinged to each longitudinal side thereof adapted to be secured in upright position or in a plane with said bottom to form a floor, bed frames carried by the said side members adapted to be turned to upright position at the outer edge of the supporting side member when not in use, and a knock-down wall tent adapted to be erected over and detachably supported solely by the said bottom and side members when extended, the said bed frames when folded to upright position being parallel with the side walls of the tent, and means carried by the side members for stretching the canvas of the tent.

5. In a camping wagon, a wagon bed or bottom, side members pivotally secured to each longitudinal side thereof and adapted to be secured in upright position or in a plane with said bottom to form a floor, end members carried by each longitudinal side member extending at a right angle thereto to form a wagon box when the side members are turned to upright position, a knock-down wall tent construction erectable over the bottom and side members when extended, poles carried by the said end members, longitudinal members carried between each of said poles on each side providing a support for the tent and guy ropes attached to the side members adapted to draw downward upon the ridge members of the supporting poles.

6. A camping wagon comprising a wagon bed or bottom, a running gear therefor, longitudinal side members in hinged relation with said bottom adapted to be secured in upright position or in a plane with said bottom to form a floor, end members secured to each end of each side member and forming a box therewith when said side members are turned to upright position, pole sockets at each end of said bottom, each of said end members having a support for a pole, a pole carried by each end member and in each socket, longitudinal ridge bars extending between each pair of said poles on opposite ends of the device, a canvas cover adapted to be stretched over said framework and secured to the said longitudinal side members, and bed frames in hinged relation with said side members adapted to be folded to upright position at the outer edge of said side members to provide a clear floor space, or folded down parallel with the said side members when extended for use as a bed.

7. A camping wagon adapted for use as a trailer comprising a wagon bed or bottom, longitudinal side members in hinged relation with the said bottom adapted to be secured in upright position or in a plane with said bottom to form a floor, end members secured at a right angle to each side member forming a box therewith when said side members are turned to upright position, pole sockets at each end of said bed or bottom, a pole in each of said sockets, each of said end members having supports for a pole adapted to hold a pole at an angle to the vertical, a pole carried by the said sockets on each end member, longitudinal bars extending between each pair of said poles on opposite ends of the device, a canvas cover of tent like form adapted to be stretched over the said bars and secured to the said side and end members, a canvas fly carried over the tent canvas, a frame carried on each side of the tent at the ends of the angularly positioned poles for holding the fly out of contact with the tent, and guy ropes attached to the said frame and fly and to the said longitudinal side members adapted to stretch the fly over the tent.

8. A camping wagon adapted for use as a trailer comprising a wagon bed or bottom provided with a running gear, longitudinal side members in hinged relation with said bottom adapted to be turned in upright position, or in a plane with said bottom to form a floor, extensible supports pivotally carried at the free edge of said side members by means of which they may be supported in a plane with said bottom, bed frames in hinged relation with said side members adapted to be turned to vertical position at the outer edge of said side members when extended, or parallel therewith when said side members are in upright position, end members carried by the said side members to form a box therewith when in upright position, and a knock-down tent construction adapted to be detachably supported by the wagon bottom and side members when in extended relation, the said tent construction being supported solely by the said wagon bottom and side and end members.

In testimony whereof, I sign this specification.

EDWARD W. REID.